Patented Jan. 20, 1953

2,626,257

UNITED STATES PATENT OFFICE 2,626,257

MEDICAL DUSTING POWDER

Carlyle G. Caldwell, Flushing, and Thomas Aubrey White, Jackson Heights, N. Y., William L. George, Middlesex, N. J., and James J. Eberl, Moylan, Pa., assignors to Johnson & Johnson, a corporation of New Jersey, and National Starch Products Inc., a corporation of Delaware No Drawing. Application May 21, 1952, Serial No. 289,218

3 Claims. (Cl. 260—233.3)

This invention relates to nonirritating dusting powders and is concerned more particularly with starch derivative dusting powders for use in surgery and medicine in general.

In the use of dry glove technique by surgeons talcum powder was employed universally for several decades as a lubricant inside the gloves to prevent adhesion between glove surfaces during sterilizing and to facilitate putting on the gloves. In more recent years there was convincing clinical evidence that severe postoperative complications, strong inflammatory reactions and particularly adhesions were caused frequently by presence of lycopodium or talc in cavities that had been operated on. There were literature reports of peritonitis requiring several operations, and of granuloma of the rectum, vagina, cervix, brain and of various types of wounds, all caused by lycopodium or by talc that was traced to the surgeon's glove. One investigator reported talc in the peritoneal cavity in forty out of fifty patients who had undergone laparatomies. The reasons for this are obvious in view of the fact that talc is present during operations in nearly all surgeons' gloves, and furthermore in view of clinical reports that in 74.4 per cent of operations, gloves were torn and that 22.6 per cent of all gloves used showed rents or punctures. Even persons who were not subjected to internal application of talcum have suffered severely from it. Talcum in the respiratory tract is dangerous and has caused severe breathing difficulties to infants, hospital patients and nurses when used carelessly and/or permitted to contaminate the air in large amounts. Quite recently several substitutes for talcum in medical uses were proposed and clinically tested, but all those reported were found to be toxic, to have flow and dusting qualities that were much inferior to talcum, to exhibit a tendency to gelatinize or agglutinate during autoclave sterilizaton and/or to cause adhesions, enlarged mesenteric nodes and/or inflammatory lymphoid hyperplasia when used in operations.

Broadly stated, the object of the present invention is to provide compounds suitable for use as medical dusting powders. More particularly the object is to prepare a dusting agent that is absorbable and harmless to body tissues. A further object is to provide a dusting agent that withstands steam sterilization without losing either its flow properties or its quality of absorbability by body tissues. Yet other objects are to provide compounds that do not cause allergies and that can be prepared having sufficient fineness to be lubricating agents for frictional surfaces such as rubber gloves. Other objects will be apparent as the invention is more fully described hereinafter.

The foregoing and other objects may be accomplished in accordance with the present invention that provides an ungelatinized starch composed of granules, substantially in their original unswollen form, partially etherified to a degree corresponding to treatment in aqueous dispersion with an etherifying agent that etherifies more than one (preferably two) functional groups of the starch (hereafter referred to as "dietherifying agent") in an amount sufficient theoretically to link 1.7–4.5 per cent of the hydroxyl groups present in the starch, and that is satisfactory for use in surgical, medical and clinical applications without causing the ill effects commonly associated with dusting powders of the prior art.

Clinical tests have shown that starch granules etherified to the above specified degree are completely absorbable by the peritoneum without inflammatory reaction and without the formation of adhesions and can be made completely sterile under standard autoclaving procedure after contamination with spores of heat resistant organisms. If a lower degree of etherification is reached than specified above, the powder tends to agglutinate and does not remain in powdery condition after sterilization at high temperatures, e. g. at 245° F., and fifteen pounds pressure when held in an autoclave for thirty minutes; if a higher degree of etherification is reached than specified above, the product tends to be toxic to the human organism and may not be used safely, apparently because the enzymes of the organism are unable to penetrate starch that is thus reacted.

For purposes of calculating the amount of etherifying reagent to be used, the structural formula of the recurring unit in starch may be represented as:

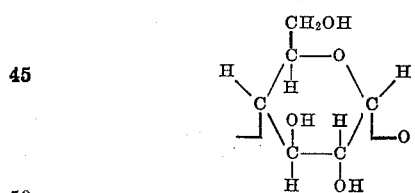

Theoretically at least it is possible for each of the hydroxyl groups on each recurring unit of the starch molecule to react with one of the two reactive groups of the dietherifying agent. Accordingly, one and one half molecules of dietherifying agent are necessary theoretically to effect complete cross linkage of all the hydroxyl groups of the starch molecule. Actually, products satisfactory for the purpose of this invention are formed by etherification in the aqueous system only if the dietherifying agent is used in molecular ratios of 1.7–4.5 per cent of the ratio theoretically necessary to effect reaction with all the hydroxyl groups. In other words the product of this invention is cross-linked to a degree that is considerably lower even than would be the case in a starch wherein one hydroxyl group per recurring unit is cross-linked. Within the limited range given, an ungelatinized starch product that is partially etherified corresponding to treatment in aqueous dispersion with etherifying reagent in an amount to effect 2–3 per cent of the theoretically possible linkage is preferred because at this reaction stage the product is resistant to gelatinization and quite readily absorbable by the organism.

In preferred manners of obtaining the above specified partially etherified product, starch, in its non-gelatinized form is treated with dietherforming halogen compounds taken from the group comprising halohydrins and epoxyhalohydrins in proportions to effect the desired degree of etherification substantially without gelatinization. Preferred ether-forming agents are the dihalohydrins and ether forming epoxyhalohydrin compounds, wherein the halogen is chlorine and/or bromine. As examples of such etherforming compounds there may be mentioned any of the glycerol dibromohydrins, glycerol dichlorohydrins, epichlorohydrin and epibromohydrin.

In order to disclose more clearly the nature of the invention, preferred embodiments thereof will be described now in considerable detail. It should be understood, however, that this is done by way of example only, and solely for the purpose of illustrating by means of specific examples, the basic principles which are broadly applicable to all materials contemplated in the present invention, i. e. the invention is not restricted to the specific examples hereinafter described.

The reaction is carried out preferably with the starch in aqueous suspension although an equivalent product may be obtained using a dry process. In view of the fact that the reaction is relatively inefficient and incomplete using the dry process, a larger amount of the dietherifying agent corresponding to approximately twice the amount by weight used in the liquid process is used preferably in practical embodiments of this process. When working with aqueous starch suspensions, it is important that the alkalinity of the system should not be so great as to cause gelatinization of the starch. By addition of gelatinization retarders, e. g. sodium sulfate, to the starch suspension, gelatinization can be avoided even though the quantity of alkali may be high enough to cause gelatinization in absence of the retarders. A minor amount of alkali in the reaction mixture is necessary to neutralize hydrochloric or equivalent acids formed during the reaction because the etherification does not take place in an acid medium.

Using the aqueous method for producing the partially etherified starch of the invention, starch is first suspended in water, gelatinization retarder and later alkali is added to the suspension, followed by the addition of the etherifying reagent. Using the dry method, commercially dry starch is mixed with the alkali material and the dietherifying reagent, and these are made to react preferably under heat until the desired degree of resistance to gelatinization is reached.

The following examples, wherein all parts are parts by weight, illustrate the actual preparation of the partially etherified starch products of the invention:

*Example I*

Ungelatinized corn starch (100 parts) is added under agitation to a solution containing sodium hydroxide (2.0 parts), water (150 parts), and sodium sulfate (25 parts). To this suspension is added glycerol dichlorohydrin (4.0 parts) and the reaction is allowed to continue at room temperature for fifteen hours under constant agitation. At the end of this period, the alkali is neutralized with the dilute mineral acid, e. g. hydrochloric acid, and the starch is filtered, washed several times with water, and dried. The product is absorbable and harmless to body tissues, withstands steam sterilization without gelatinization or agglutination, does not cause allergies and is a satisfactory lubricating agent for frictional surfaces such as rubber gloves.

*Example II*

Commercially dry corn starch (100 parts) is blended with soda ash (10 parts) and epichlorohydrin (5 parts) and the blend maintained at approximately 60° C. for twenty-four hours. The resultant starch product is washed to remove impurities, excess alkali is neutralized and the product is dried. The purified product shows the same properties as the product of Example I.

*Example III*

Corn starch (100 parts) is added under agitation to a solution containing sodium hydroxide (2.0 parts), water (100 parts) and sodium sulfate (25 parts). To this suspension is added epichlorohydrin (2 parts) and the reaction is allowed to continue at room temperature for fifteen hours under constant agitation. The alkali is then neutralized with dilute mineral acid, e. g. hydrochloric acid, the starch product filtered, washed several times with water and dried. The product has the same properties as the product of Examples I and II.

In any of the examples other dietherifying agents discussed earlier in the specification may be utilized instead of those mentioned specifically in the examples and desired proportions of reagents within the critical range may be selected.

The partially etherified starch produced by reaction of ungelatinized starch with the etherifying reagents described herein is in the physical form of starch granules substantially remaining in their original unswollen shape and having sufficient resistance to gelatinization to withstand sterilization as discussed above. This resistance to gelatinization is probably caused by the above described bridging of the hydroxyl groups on the surfaces of the starch granules that tends to retard swelling and bursting of the granules. The product of the invention may be obtained from any of the raw starches, e. g., from corn, tapioca, sago, potato, wheat, waxy maize, sweetpotato or rice.

Within the critical ranges shown earlier in this specification, the amount of etherification may be varied by simple variation of the amount of etherifying agent, reaction with which is carried as nearly to completion as possible. It will be apparent to those skilled in the art how to derive by judicial selection of the type of raw starch, type and amount of etherifying reagent and reaction conditions, the precise type of etherified starch desired in particular medical, surgical or clinical applications.

For most effective use as a dusting powder, it is important that the starch derivatives should have the freest possible flow properties. A certain extent of packing or caking is a normal characteristic of many types of starches and starch derivatives including those described herein. It is possible, however, by means of a method somewhat similar to the one described in application Serial Number 794,101, of Thomas Aubrey White, filed December 26, 1947, now abandoned, to improve the dry flow properties of the products of the invention by the addition of relatively small proportions of inorganic flow agents, and preferably of finely ground, crystalline, non-hygroscopic metal oxides, not materially more water-soluble than magnesium oxide; or addition of magnesium carbonate; or of tricalcium phosphate. As examples of such oxides, magnesium oxide, zinc oxide, nickel oxide, titanium dioxide, lead oxide and tin oxide may be named. The flow agent may be added in the dry state to the dry, partially etherified starch or alternately may be added to the aqueous starch suspension. In either case, the resultant compound comprising the flow agent has excellent flow characteristics. The proportion of flow agent to be used varies with the type of starch derivatives that is to be improved, the particular flow agent selected, the degree of free flow desired and related factors. Generally, only a very small amount is necessary and we have found that quantities as low as 0.1 per cent of magnesium oxide, based on the weight of the etherified starch, are sufficient to bring about substantially improved flow properties. The degree of improvement is increased as the amount of flow agent increases in the composition. Generally, it is preferred to use quantities of flow agent within the range of 0.05 to 10 per cent based on the weight of the partially etherified starch. This range, however, is merely a statement of preference, because greater quantities than those mentioned would not ordinarily cease to be effective even though absorbability of the products is reduced in presence of such an inorganic flow agent.

In view of the object of the invention of providing an absorbable dusting powder that is harmless to body tissues, it is important to select a flow agent that is known to be harmless in the quantities used when introduced into the human system. Of the metal oxides mentioned above, nickel oxide, tin oxide and particularly magnesium oxide satisfy this requirement best and are preferred for that reason. In determining suitability of these and other flow agents for surgical purposes, it will be advisable to pretest the formulations selected in animal experiments before applying such formulations to operations on the human organism. When added to any of the above described etherified starch products, the flow agents mentioned improve flow materially.

Powders in accordance with the invention are preferably free of coarseness and accordingly comply usually with the specifications that require not more than 1 per cent by weight of the powder to be retained by 100 mesh screen. In preferred embodiments of the invention the final product will be fine enough so that not substantially more than one-half per cent by weight is retained by 200 mesh screen.

Many other variations of the above described invention will be apparent to those skilled in the art and are included in the inventive concepts.

This application is a continuation-in-part of patent application Serial Number 21,312, filed April 15, 1948, now abandoned, by the same inventors.

We claim:

1. A medical dusting powder comprising a starch powder in its non-gelatinized state partially etherified to a degree corresponding to treatment in aqueous suspension with an agent causing formation of diether linkages wherein chains having more than one carbon separate the oxygen bonds, in an amount sufficient to link 2–3 per cent of the free hydroxyl groups, said dusting powder comprising from about 0.05 to about 10 per cent of its weight of magnesium oxide.

2. A medical dusting powder comprising a minor proportion 0.05–10 per cent by weight, of a flow agent selected from the group of metal oxide flow agents comprising nickel oxide, tin oxide, magnesium oxide and magnesium carbonate and a major proportion of a finely divided starch powder in the physical form of non-gelatinized starch granules partially etherified to a degree corresponding to treatment in aqueous suspension with an agent causing formation of diether linkages wherein chains having more than one carbon separate the oxygen bonds, in an amount sufficient to link 1.7–4.5 per cent of the free hydroxyl groups.

3. A medical dusting powder comprising a starch powder in its non-gelatinized state partially etherified to a degree corresponding to treatment in aqueous suspension with an agent causing formation of diether linkages wherein chains having more than one carbon separate the oxygen bonds, in an amount sufficient to link 2–3 per cent of the free hydroxyl groups, said dusting powder comprising from about 0.05 to about 10 per cent of its weight of magnesium carbonate.

CARLYLE G. CALDWELL.
THOMAS AUBREY WHITE.
WILLIAM L. GEORGE.
JAMES J. EBERL.

REFERENCES CITED

The following references are of record in the file of this patent:

UNITED STATES PATENTS

| Number | Name | Date |
| --- | --- | --- |
| 982,673 | Herstein | Jan. 24, 1911 |
| 2,417,611 | Pierson | Mar. 18, 1947 |
| 2,451,686 | Moller et al. | Oct. 19, 1948 |
| 2,459,108 | Lolkema | Jan. 11, 1949 |
| 2,469,957 | Fenn | May 10, 1949 |
| 2,500,950 | Konigsberg | Mar. 21, 1950 |

FOREIGN PATENTS

| Number | Country | Date |
| --- | --- | --- |
| 91,411 | Austria | Feb. 26, 1923 |

OTHER REFERENCES

Poucher, "Perfumes, Cosmetics and Soaps," vol. 2, 3rd edition, 1929, page 482.